US007472015B2

(12) United States Patent
Mc Lain et al.

(10) Patent No.: US 7,472,015 B2
(45) Date of Patent: Dec. 30, 2008

(54) LIQUID FUEL DETECTION SYSTEM

(75) Inventors: Kurt D. Mc Lain, Clarkston, MI (US); Wenbo Wang, Novi, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 3 days.

(21) Appl. No.: 11/560,997

(22) Filed: Nov. 17, 2006

(65) Prior Publication Data

US 2008/0120015 A1 May 22, 2008

(51) Int. Cl.
*F02D 41/04* (2006.01)
*F02D 41/14* (2006.01)
*G06F 19/00* (2006.01)

(52) U.S. Cl. ....................... 701/104; 701/109; 123/518; 123/704

(58) Field of Classification Search ................. 123/698, 123/699, 518, 520, 525, 526, 549; 701/108, 701/109, 110
See application file for complete search history.

(56) References Cited

U.S. PATENT DOCUMENTS 5,048,492 A * 9/1991 Davenport et al. .......... 123/674
5,048,493 A * 9/1991 Orzel et al. ................. 123/674
5,245,978 A * 9/1993 Orzel ......................... 123/674
5,957,113 A * 9/1999 Masaki et al. ............... 123/518
7,299,794 B2 * 11/2007 Sexton ....................... 123/698

OTHER PUBLICATIONS

OBD II, 2000 Actron Manufacturing Co. Printed USA.*

* cited by examiner

*Primary Examiner*—Willis R. Wolfe, Jr.
*Assistant Examiner*—Johnny H. Hoang

(57) ABSTRACT

A liquid fuel detection system for a fuel vapor system of a vehicle providing fuel vapor to an engine operating in closed loop includes an oxygen sensor that generates an oxygen signal based on an oxygen level in engine exhaust. An engine speed sensor generates a speed signal based on a speed of the engine. And a control module receives the oxygen signal and the speed signal, determines a fuel control factor based on the oxygen signal, determines a long term modifier based on long term changes of the fuel control factor, and detects the presence of liquid fuel in the fuel vapor system based on the fuel control factor, the speed signal, and the long term modifier.

17 Claims, 4 Drawing Sheets

LIQUID FUEL DETECTION SYSTEM

FIELD

The present invention relates to detection systems, and more particularly to liquid fuel detection systems.

BACKGROUND

Internal combustion engines combust an air/fuel (A/F) mixture within cylinders to drive pistons and to provide drive torque. Air is delivered to the cylinders and an intake manifold via a throttle. A fuel injection system supplies fuel from a fuel tank to provide fuel from a desired A/F mixture to the cylinders. To prevent release of fuel vapor, vehicles also typically include an evaporative emissions system, which includes a canister that absorbs fuel vapor from a fuel tank, a canister vent valve and a purge valve. The canister vent valve allows air to flow into the canister. The purge valve supplies a combination of air and vaporized fuel from the canister to the intake system.

Closed-loop control systems adjust inputs of a system based on feedback from outputs of the system. By monitoring the amount of oxygen in the exhaust, closed-loop fuel control systems manage fuel delivery to an engine. Based on the output of oxygen sensors, the engine control module adjusts the fuel delivery to match the ideal A/F ratio (14.7 to 1). By monitoring the engine speed variation at idle, closed-loop speed control systems manage engine intake airflows and spark advance.

Under some circumstances, liquid fuel rather than fuel vapor can be present in the canister. Controlling the fuel system when liquid fuel is present in the canister can be a difficult task. Liquid fuel in the canister can produce high engine emissions, undesirable idle surge, steady throttle surge, or engine stall. If this problem occurs, a vehicle may also fail evaporative emissions requirements.

SUMMARY

Accordingly, a liquid fuel detection system for a fuel vapor system of a vehicle providing fuel vapor to an engine operating in closed loop includes an oxygen sensor that generates an oxygen signal based on an oxygen level in engine exhaust. An engine speed sensor generates a speed signal based on a speed of the engine. And a control module receives the oxygen signal and the speed signal, determines a fuel control factor based on the oxygen signal, determines a long term modifier based on long term changes of the fuel control factor, and detects the presence of liquid fuel in the fuel vapor system based on the fuel control factor, the speed signal, and the long term modifier.

In another feature, the control module detects the presence of liquid fuel when the fuel control modifier drops below a minimum for a selectable period of time.

In another feature, the control module detects the presence of liquid fuel in the fuel vapor system when the speed signal and the fuel control factor indicate engine instability.

In other features, the control module detects the presence of liquid fuel in the fuel vapor system when engine idle conditions are met. Engine idle conditions are met if throttle position is less than a minimum throttle position value and vehicle speed is less than a minimum vehicle speed value.

In still other features, the control module sets a liquid fuel notification code when the presence of liquid fuel is detected a selectable number of times and the control module sends an off-board communication signal when the presence of liquid fuel is detected a selectable number of times.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

Figure 1:
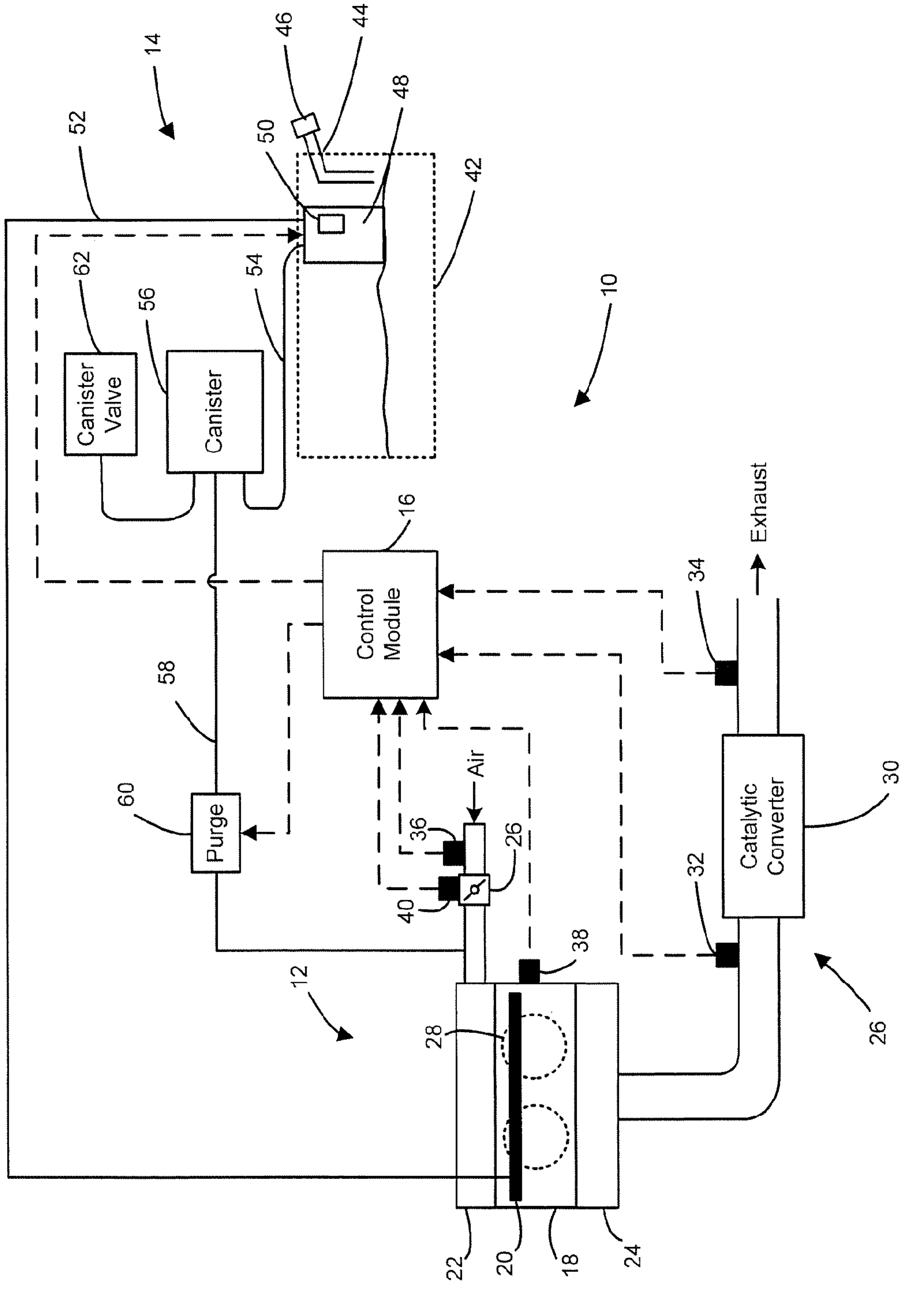
FIG. 1 is a functional block diagram of an engine control system and a fuel system according to the present invention.

The following description of the preferred embodiment(s) is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Referring to FIG. 1, a vehicle 10 includes an engine system 12 and a fuel system 14. One or more control modules 16 communicate with the engine and fuel systems 12, 14. The fuel system 14 selectively supplies liquid and/or fuel vapor to the engine system 12, as will be described in further detail below.

The engine system 12 includes an engine 18, a fuel injection system 20, an intake manifold 22, and an exhaust manifold 24. Air is drawn into the intake manifold 22 through a throttle 26. The throttle 26 regulates mass air flow into the intake manifold 22. Air within the intake manifold 22 is distributed into cylinders 28. The air is mixed with fuel and the air/fuel mixture is combusted within cylinders 28 of the engine 18. Although two cylinders 28 are illustrated, it can be appreciated that the engine 18 can include more or fewer cylinders 28 including, but not limited to 1, 3, 4, 5, 6, 8, 10 and 12 cylinders. The fuel injection system 20 includes liquid injectors that inject liquid into the cylinders 28.

Exhaust flows through the exhaust manifold 24 and is treated in a catalytic converter 30. First and second exhaust oxygen sensors 32 and 34 (e.g., wide-range A/F ratio sensors) communicate exhaust A/F ratio signals to the control module 16. A mass air flow (MAF) sensor 36 is located within an air inlet and communicates to the control module 16 a MAF signal based on the mass of air flowing into the engine system 12. An engine speed sensor 38 senses the speed of the engine and communicates an engine speed signal to the control module 16. A throttle position sensor 40 senses the position of the throttle 26 and communicates a throttle position signal to the control module 16.

The control module 16 controls the fuel and air provided to the engine based on oxygen sensor signals and throttle valve position. This form of fuel control is also referred to as closed loop fuel control. Closed loop fuel control is used to maintain the air/fuel mixture at or close to an ideal stoichiometric air/fuel ratio by commanding a desired fuel delivery to match the airflow. Stoichiometry is defined as an ideal air/fuel ratio, which is 14.7 to 1 for gasoline. The engine control may command different airflow to compensate the engine speed changes during engine idle operation.

The engine system 12 operates in a lean condition (i.e. reduced fuel) when the A/F ratio is higher than a stoichiometric A/F ratio. The engine system 12 operates in a rich condition when the A/F ratio is less than the stoichiometric A/F ratio. A fuel control factor helps determine whether the A/F ratio is within an ideal range, i.e., greater than a minimum value and less than a maximum value. An exemplary fuel control factor includes a short term integrator (STI) that provides a rapid indication of fuel enrichment based on input from the oxygen sensor signals. For example, if the signals indicate an air/fuel ratio greater than a specified reference, STI is increased a step and if the signals indicate an air/fuel ratio less than the specified reference, STI is decreased a step. A fuel control modifier monitors changes in the fuel control factor over a long term. An exemplary fuel control modifier includes a long term modifier (LTM). LTM monitors STI and uses integration to produce its output.

The fuel system 14 includes a fuel tank 42 that contains liquid fuel and fuel vapor. A fuel inlet 44 extends from the fuel tank 42 to enable fuel filling. A fuel cap 46 closes the fuel inlet 44 and may include a bleed hole (not shown). A modular reservoir assembly (MRA) 48 is disposed within the fuel tank 42 and includes a fuel pump 50. The MRA 48 includes a liquid fuel line 52 and a fuel vapor line 54.

The fuel pump 50 pumps liquid fuel through the liquid fuel line 52 to the fuel injection system 20 of the engine 18. A fuel vapor system includes the fuel vapor line 54 and a canister 56. Fuel vapor flows through the fuel vapor line 54 into the canister 56. A fuel vapor line 58 connects a purge valve 60 to the canister 56. The control module 16 modulates the purge valve 60 to selectively enable fuel vapor flow to the intake system of the engine 18. The control module 16 modulates a canister vent valve 62 to selectively enable air flow from atmosphere into the canister 56.

Figure 2:
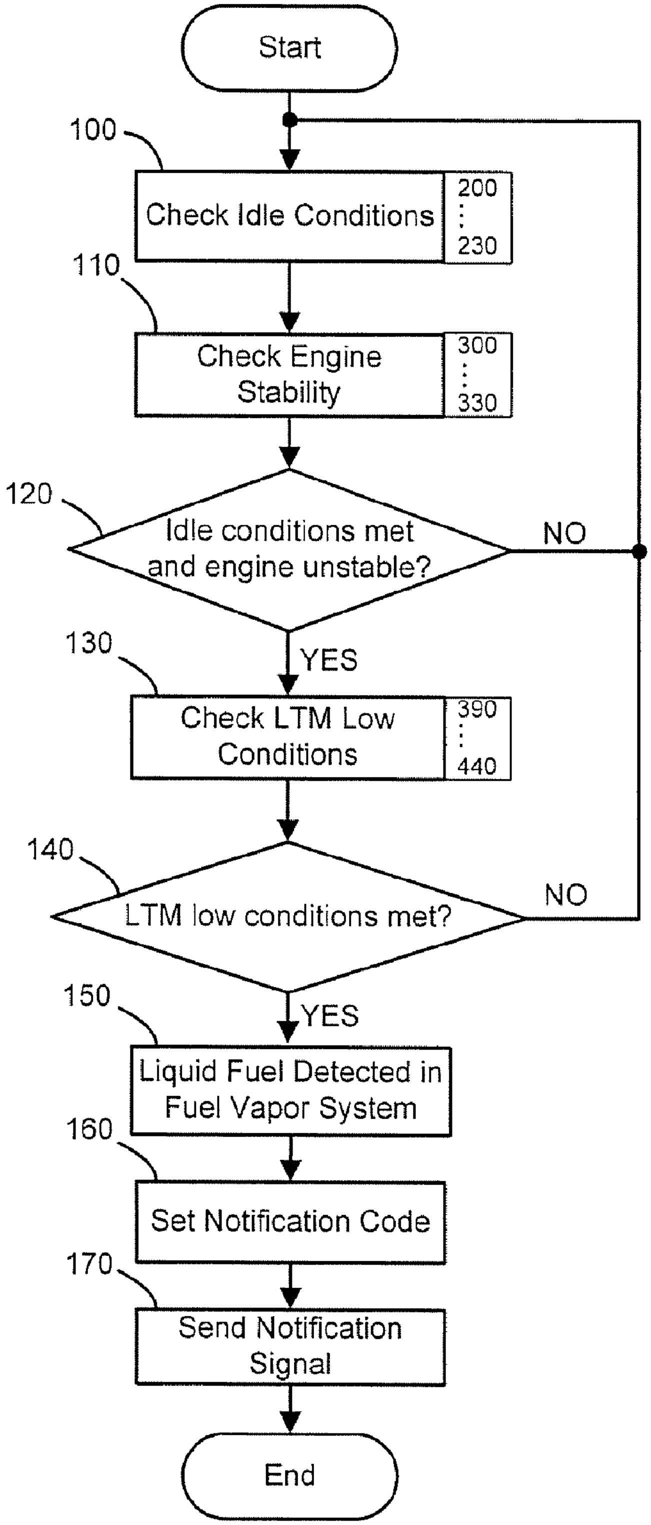
FIG. 2 is a flowchart illustrating a method of detecting the presence of liquid fuel in the fuel vapor system.

Referring to FIGS. 1 and 2, the steps performed by the control module to detect liquid fuel in the fuel vapor system will be described in more detail. The following method is performed continually when the engine system 12 is operating under closed loop fuel control. Control checks idle conditions to determine if the vehicle 10 is operating at idle at 100. Control checks engine operating characteristics to determine instability at 110. If idle conditions are met and the engine operating conditions indicate instability at 120, control checks LTM low conditions at 130. LTM low conditions occur when LTM value remains low for a selectable period of time. If idle conditions are not met or engine operating conditions indicate stability at 120, control returns to checking idle conditions at 100. If LTM low conditions are met at 140, liquid fuel is deemed present in the fuel vapor system at 150. If the LTM low conditions are not met, control returns to check idle conditions at 100.

Once control detects liquid fuel in the fuel vapor system, control may set a notification code at 160 and a notification signal is sent at 170. The signal can be in the form of a diagnostic code that can be retrieved by a service tool connected to the vehicle, in the form of a signal that illuminates an indicator light viewable by an operator and/or in the form of a diagnostic code that is broadcast to a remote service technician. Alternatively (flow not shown), control may wait until fuel has been detected in the vapor system a consecutive number of times or a selected number of times within a specified time period before setting a notification signal or sending the notification signal.

Figure 3:
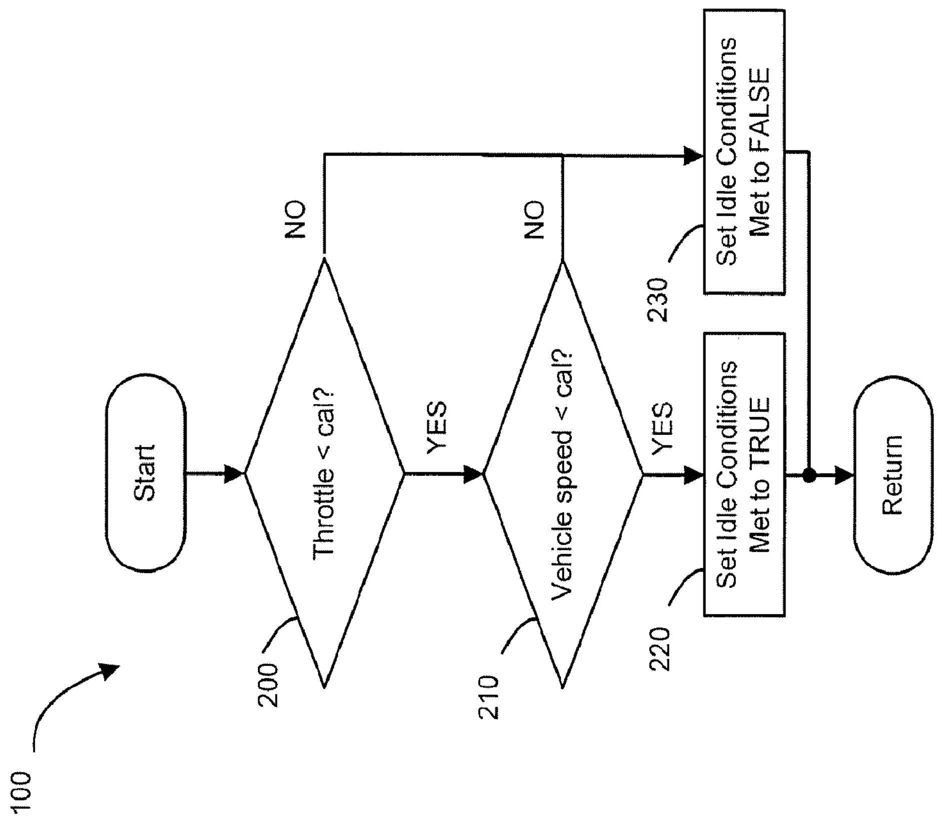
FIG. 3 is a flowchart illustrating a method of checking engine idle conditions.

Referring now to FIG. 3, a method of checking idle operating conditions referred to at process box 100 in FIG. 2 will be discussed in more detail. Control evaluates whether the throttle position signal is less than a minimum value at 200. The minimum value can be selectable. If the throttle position is less than the minimum at 200, control evaluates the vehicle speed at 210. If the vehicle speed is less than a minimum speed value at 210, idle conditions are deemed met at 220 and an idle conditions met flag is set to TRUE. If the throttle position is greater than or equal to the minimum at 200 or the vehicle speed is greater than or equal to the maximum at 210, idle conditions are deemed not met and the idle conditions met flag is set to FALSE at 230.

Figure 4:
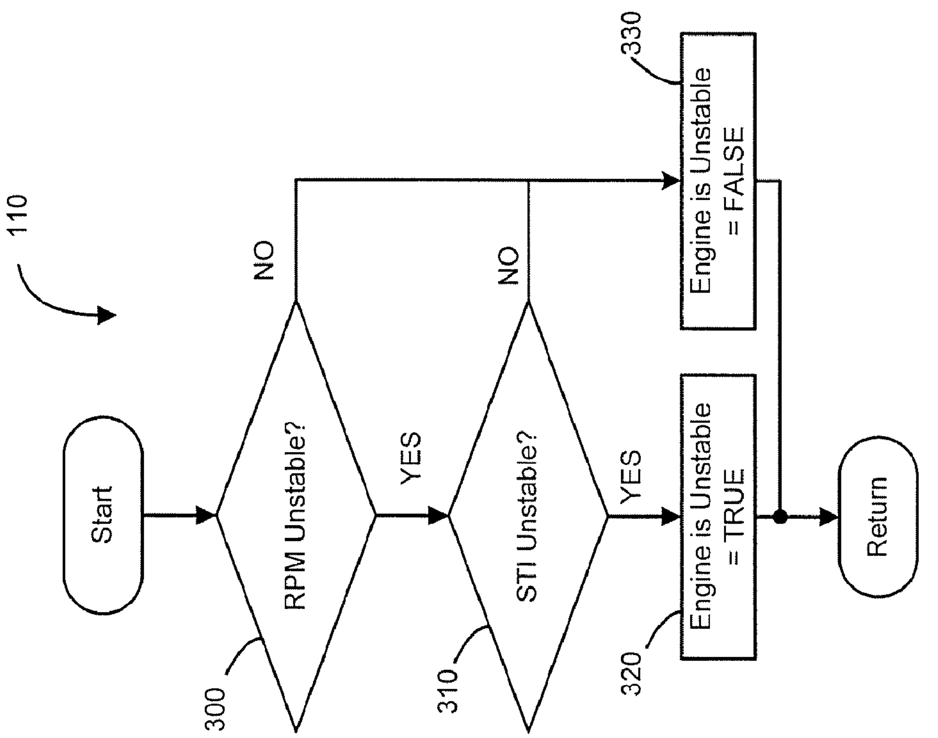
FIG. 4 is a flowchart illustrating a method of checking engine stability conditions.

Referring now to FIG. 4, a method of checking engine stability referred to at process box 110 of FIG. 2 will be discussed in more detail. Control evaluates engine speed at 300. If engine speed deviates from a desired engine speed a selectable number of times at 300, control evaluates STI in step 310. If STI deviates from a selected value (i.e. 100 percent) by a selectable amount and for a selectable number of times, engine is deemed unstable and an engine unstable flag is set to TRUE at 320. If the engine is stable at 300 and the STI is stable at 310, the engine unstable flag is set to FALSE at 330.

Figure 5:
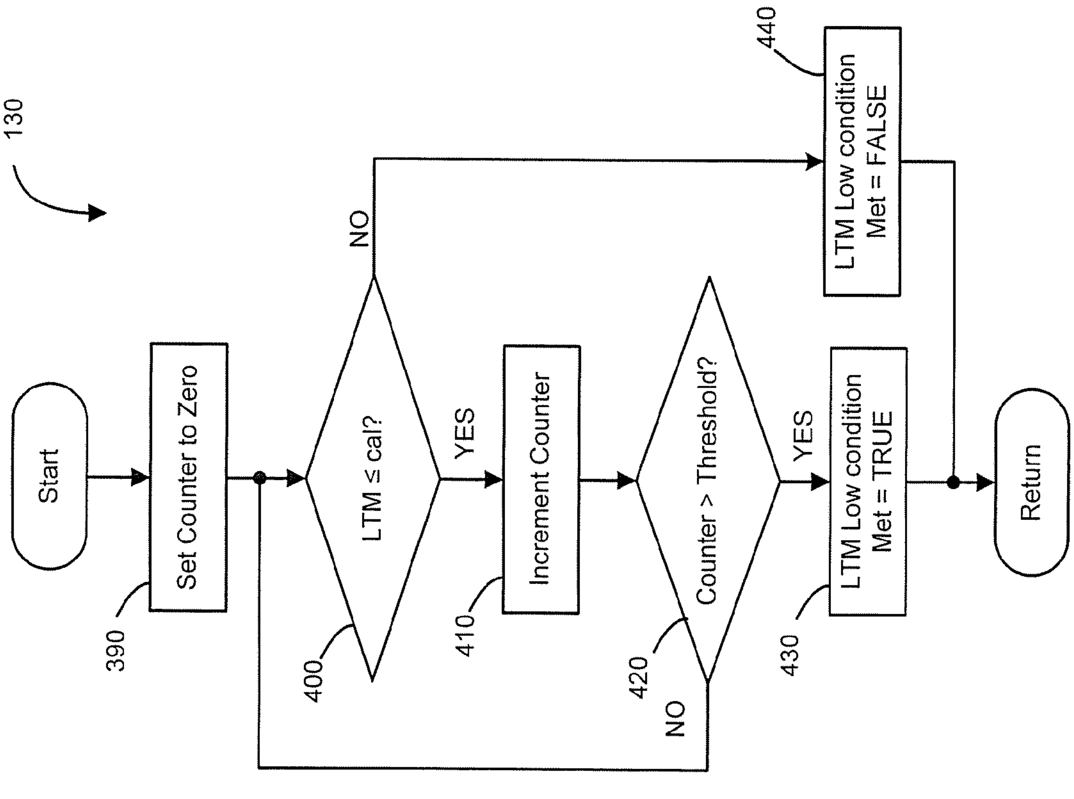
FIG. 5 is a flowchart illustrating a method of checking long term modifier low conditions.

Referring now to FIG. 5, a method of checking LTM low conditions referred to at process box 130 of FIG. 2 will be discussed in more detail. A counter is initialized to zero at 390. If the LTM is less than or equal to a selectable minimum at 400, a counter is incremented at 410. If the counter is greater than a threshold at 420, a LTM low condition is set to TRUE at 430. If the counter is less than or equal to the threshold at 420, control returns to evaluate LTM at 400. If the LTM is greater than the selectable minimum at 400, the LTM low condition flag is set to FALSE at 440.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. A liquid fuel detection system for a fuel vapor system of a vehicle providing fuel vapor to an engine operating in closed loop, comprising:

an oxygen sensor that generates an oxygen signal based on an oxygen level in engine exhaust;

an engine speed sensor that generates a speed signal based on a speed of said engine; and a control module that receives said oxygen signal and said speed signal, that determines a fuel control factor based on said oxygen signal, that determines a long term modifier based on long term changes of said fuel control factor, and that detects a presence of a liquid fuel in said fuel vapor system based on said fuel control factor, said speed signal, and said long term modifier.

2. The liquid fuel detection system of claim 1 wherein said control module detects the presence of said liquid fuel when said fuel control modifier is below a minimum for a selectable period of time.

3. The liquid fuel detection system of claim 1 wherein said control module detects the presence of said liquid fuel in said fuel vapor system when said speed signal and said fuel control factor indicate engine instability.

4. The liquid fuel detection system of claim 1 wherein said control module detects the presence of said liquid fuel in said fuel vapor system when engine idle conditions are met.

5. The liquid fuel detection system of claim 4 wherein said engine idle conditions are met if throttle position is less than a minimum throttle position value and vehicle speed is less than a minimum vehicle speed value.

6. The liquid fuel detection system of claim 5 wherein said minimum throttle position value and said minimum vehicle speed value are selectable.

7. The liquid fuel detection system of claim 1 wherein said control module sets a liquid fuel notification code when the presence of said liquid fuel is detected a selectable number of times.

8. The liquid fuel detection system of claim 1 wherein said control module sends an off-board communication signal when the presence of said liquid fuel is detected a selectable number of times.

9. The liquid fuel detection system of claim 8 wherein said control module sends said off-board communication signal to a service tool connected to said vehicle.

10. The liquid fuel detection system of claim 8 wherein said control module said off-board communication signal illuminates an indicator light viewable by an operator of said vehicle.

11. The liquid fuel detection system of claim 8 wherein said control module broadcasts said communication signal to a remote service technician.

12. A method of detecting a presence of a liquid fuel in a fuel vapor system of an engine operating in closed loop, comprising:

receiving an engine speed signal;

receiving an oxygen sensor signal;

determining an engine speed from said engine speed signal;

determining an oxygen level from said oxygen sensor signal;

determining a short term integrator from said oxygen level;

determining a long term modifier from said short term integrator;

checking engine instability based on said short term integrator and said engine speed; and detecting the presence of said liquid fuel in said fuel vapor system based on said engine instability when said long term modifier decreases below a minimum value for a selectable period of time.

13. The method of claim 12 further comprising setting a notification code and sending a notification signal including said notification code.

14. The method of claim 13 wherein said steps of setting a notification code and said step of sending a notification signal is performed once the presence of said liquid fuel is detected a selectable number of times.

15. The method of claim 13 further comprising illuminating an indication light viewable by an operator based on said notification code.

16. The method of claim 12 further comprising determining if idle conditions are met and wherein said step of detecting is performed once idle conditions are met.

17. The method of claim 16 wherein said step of determining if idle conditions met comprises evaluating a throttle position and a vehicle speed.

* * * * *